United States Patent [19]

Ziu

[11] Patent Number: 5,690,148
[45] Date of Patent: Nov. 25, 1997

[54] CLOSURE FITTING AND FLEXIBILITY SUPPORT ASSEMBLY FOR DOUBLE-CONTAINMENT PIPING SYSTEMS

[76] Inventor: Christopher G. Ziu, 7 Douglas St., Merrimack, N.H. 03054

[21] Appl. No.: 667,757

[22] Filed: Jun. 21, 1996

[51] Int. Cl.⁶ .............................. H05B 13/02; H05B 3/58
[52] U.S. Cl. ............... 138/171; 138/157; 138/156; 138/113; 285/21.1; 285/21.2; 219/535; 219/544
[58] Field of Search .................................. 138/171, 170, 138/157, 156, 100, 110–114, 103, 99; 285/21.2, 21.1, 419, 373; 219/535, 544; 156/275.1

[56] References Cited

U.S. PATENT DOCUMENTS

| | | | |
|---|---|---|---|
| 4,111,234 | 9/1978 | Wells et al. | 138/99 |
| 4,260,181 | 4/1981 | Curtin | 138/99 X |
| 4,274,662 | 6/1981 | De Groot et al. | 285/21.1 |
| 4,436,987 | 3/1984 | Thalmann et al. | 219/535 |
| 4,629,216 | 12/1986 | Pedersen | 219/544 X |
| 4,932,257 | 6/1990 | Webb | 285/21.2 X |
| 4,967,800 | 11/1990 | Heilmayr et al. | 138/157 X |
| 5,252,157 | 10/1993 | Inhofe, Jr. | 156/158 |
| 5,252,810 | 10/1993 | Trosch et al. | 219/544 |
| 5,345,972 | 9/1994 | Goglio et al. | 138/99 |
| 5,364,130 | 11/1994 | Thalmann | 285/21.2 |
| 5,369,248 | 11/1994 | Dufour et al. | 285/21.2 X |
| 5,398,974 | 3/1995 | Mizukawa et al. | 285/21.2 |
| 5,433,484 | 7/1995 | Ewen et al. | 285/21.2 |
| 5,618,065 | 4/1997 | Akiyama | 285/21.2 |

FOREIGN PATENT DOCUMENTS

| | | | |
|---|---|---|---|
| 2606120 | 5/1988 | France | 285/21 |
| 2-30517 | 1/1990 | Japan | 285/21 |

*Primary Examiner*—Patrick Brinson
*Attorney, Agent, or Firm*—McCormick, Paulding & Huber

[57] ABSTRACT

In a closure fitting assembly two identical fittings are adapted to be coupled together in a mirror-image relationship for closing a gap between containment components in a double-containment system. Each fitting defines a first axially-extending fusion surface located on one side of the fitting; a second axially-extending fusion surface located on an opposite side of the fitting relative to the first axially-extending fusion surface; a first circumferentially-extending fusion surface located on one end of the fitting; and a second circumferentially-extending fusion surface located on an opposite end of the fitting. Axially-extending fusion wires are interposed within the seams formed between opposing axially-extending fusion surfaces, and circumferentially-extending fusion wires are seated against each circumferentially-extending fusion surface for receiving electric current to heat the wires and in turn fuse opposing surfaces together. A flexibility support is also formed between the two fittings to permit axial, lateral and/or radial movement of the carrier components relative to the closure fitting and other containment components.

15 Claims, 7 Drawing Sheets

CLOSURE FITTING AND FLEXIBILITY SUPPORT ASSEMBLY FOR DOUBLE-CONTAINMENT PIPING SYSTEMS

FIELD OF THE INVENTION

The present invention relates to double-containment assemblies having inner piping or carrier components located within outer piping or containment components, and more particularly, to closure fittings for joining and supporting the containment components and to flexibility supports for supporting the inner piping within the outer piping and permitting axial, lateral and/or radial movement of the inner piping relative to the outer piping in order to accommodate, for example, thermal expansion or contraction of the double-containment components.

BACKGROUND INFORMATION

It is well known in the prior art pertinent to this invention to provide double-containment systems having inner piping or carrier components contained within outer piping or containment components in order to transport, for example, dangerous or hazardous fluids within the inner piping or carrier components. In the event of a leak or emission of fluid or vapors from the inner piping, the leaking substance may be safely contained within the outer piping or containment components. These types of systems have found widespread use in the nuclear, gas and petroleum refining, and chemical processing industries.

In most double-containment systems, there are a plurality of gaps formed between adjacent sections of outer piping and/or other containment components, which are provided to access joints in the inner piping and/or carrier components in order to form the joints and to later leak test, pressure test or otherwise test the integrity of the carrier components and/or their joints. For example, it is considered good piping practice when installing and testing pipes for chemical use to provide such gaps in order to perform hydrostatic pressure tests on the primary pipe joints and to allow visual access to these joints when performing such tests. Accordingly, once the joints for the inner piping or carrier components are completed, such as by welding, solvent-cement bonding or heat fusion, and the primary system tests are completed, there are corresponding gaps formed between the outer piping or containment components.

It is a common problem or difficulty to close these gaps in an efficient and effective manner when assembling double-containment systems. The known methods or fittings for closing gaps formed between the ends of double-containment piping assemblies are referred to as "mid-line closures", and include: (i) split-pipe sections, also referred to as "clam-shell" couplings, (ii) weld wraps, (iii) sheet wraps, and (iv) slip couplings. Examples of each of these types of mid-line closures are illustrated in Christopher G. Ziu, *Handbook of Double Containment Piping Systems* § 11.1.2.4 (1995).

Although these types of closures have been problematic for double-containment piping systems made with many types of materials, they have been particularly problematic in thermoplastic applications. For polypropylene (PP) and high density polyethylene (HDPE) applications, the most common methods for joining the circumferential ends in each of these types of mid-line closures, and for joining the longitudinal seams in the weld wrap and clam-shell closures, have been hot-gas welding, and to a lesser extent, extrusion welding. Polyvinylidene fluoride (PVDF) has also been a widely used material in double-containment piping systems, and is likewise a heat-fusible thermoplastic that may be joined in this manner. For PVC applications, solvent cementing and adhesive bonding have also been used to join the seams in these types of closures, and in fiberglass applications, adhesive bonding and butt-and-wrap techniques have been used.

One of the problems with these types of joining methods, is that they frequently produce a weld (or bond) quality factor of less than one (meaning that the joints are substantially weaker in some cases than the base material itself). For example, in the case of hot-gas welding, a commonly used method for joining PP and HDPE materials, a weld quality factor of approximately 0.1 to 0.4 may be expected on a long-term basis, meaning that the joint will have only about 10% to 40% of the strength of the base material.

One of the most efficient methods of joining thermoplastic piping components made of PP and HDPE is electrical-resistance welding (also referred to as "electro-fusion") wherein an electrical coil is interposed between the edges of the components forming the seam, and an electric current is passed through the coil to heat and thereby fuse the components together along the seam. Although electrical-resistance welding has been used to join the circumferential seams of polypropylene slip couplings in double-containment systems, this has produced inconsistent results with less than desirable repeatability. With slip couplings, it is difficult to properly pre-position the electric coils at the locations of the circumferential seams, and to in turn slip the coupling in place over the coils such that the parts are precisely located to thereby form a high-integrity seam. Because of practical difficulties and relatively imprecise tolerances, this approach has lead to inconsistent and unreliable results. Accordingly, although electrical-resistance welding or electro-fusion has been used to a limited extent to join circumferential seams in polypropylene slip couplings, the present inventor is not aware of these methods having been proposed or successfully applied to join the seams of clam-shell couplings or for to otherwise join the horizontal or longitudinal seams in double-containment closure fitting assemblies.

Another problem encountered in double-containment piping systems is differential thermal expansion and contraction, which occurs when the inner and outer piping components expand or contract to different degrees, or at different rates relative to each other. Almost all double-containment systems are subject to changes in temperature during operation, and/or to differences in operating temperature between the inner and outer piping components. This in turn causes differential thermal expansion and contraction which can subject the piping components to bending and/or torsional movements, intensified stress, and in some cases failure.

In order to accommodate such differential thermal expansion and contraction, flexibility supports have been developed for supporting the inner piping within the outer piping and for permitting axial, lateral and/or radial movement of the inner piping relative to the outer piping to prevent the accumulation of undesirable stress in the piping components. Typical flexibility supports are illustrated in U.S. Pat. No. 5,197,518 to Christopher G. Ziu, entitled "Centering Support Assembly For Double Containment Pipe Systems", and in U.S. Pat. No. 5,482,088 to Christopher G. Ziu, entitled "Double-Containment Systems With Axial-Guiding and Flexibility Supports".

One of the difficulties encountered in installing flexibility supports, is that they are typically placed mid-line in the double-containment piping assemblies, thus requiring gaps to be cut or otherwise formed in the outer piping or containment components for installation of the flexibility supports, and in turn requiring closure fittings to close the gaps. This can be a relatively time consuming and difficult procedure.

It is an object of the present invention to overcome the drawbacks and disadvantages of the prior art double-containment piping systems, and of the closure fitting and flexibility support assemblies of such systems.

SUMMARY OF THE INVENTION

The present invention is directed to a closure fitting assembly for closing a gap between containment components in a double-containment system. The closure fitting assembly comprises a first fitting including a first axially-extending fusion surface located on one side of the first fitting; a second axially-extending fusion surface located on an opposite side of the first fitting relative to the first axially-extending fusion surface; a first circumferentially-extending fusion surface located on one end of the first fitting; and a second circumferentially-extending fusion surface located on an opposite end of the first fitting relative to the first circumferentially-extending fusion surface.

A second fitting of the assembly is adapted for connection to the first fitting to close the gap between the containment components, and includes a first axially-extending fusion surface located on one side of the second fitting and facing the corresponding first axially-extending fusion surface of the first fitting; a second axially-extending fusion surface located on an opposite side of the second fitting relative to the respective first axially-extending fusion surface and facing the corresponding second axially-extending fusion surface of the first fitting; a first circumferentially-extending fusion surface located on one end of the second fitting; and a second circumferentially-extending fusion surface located on an opposite end of the second fitting relative to the respective first circumferentially-extending fusion surface.

At least one axially-extending fusion wire is interposed within the seams formed between opposing axially-extending fusion surfaces and is adapted to receive an electric current in order to heat the wire and fuse the axially-extending fusion surfaces forming each seam. Similarly, at least one circumferentially-extending fusion wire is seated against each circumferentially-extending fusion surface, and is likewise adapted to receive an electric current in order to heat the wire and fuse the circumferentially-extending fusion surfaces to the contiguous surfaces of the containment components.

The present invention is also directed to a flexibility support which may or may not be incorporated into the closure fitting assembly, and which includes means for permitting axial, lateral and/or radial movement of the inner piping or carrier components relative to the containment components. In one embodiment of the invention, an approximately ball-shaped bearing is seated between the first and second fittings, and defines an aperture through the bearing for receiving and supporting the carrier components and permitting the carrier components to move axially through the aperture. The bearing is also adapted to move laterally and radially, and to in turn permit lateral and radial movement of the carrier components relative to the containment components.

One advantage of the present invention is that a clamshell type coupling is provided which is relatively easy to assemble, and which provides a significantly better weld quality in its axially-extending and circumferentially-extending joints than found in the prior art closure couplings described above. In addition, the closure fitting assembly may incorporate a flexibility support, further enhancing and facilitating the ability to assemble and install mid-line flexibility supports in comparison to prior art flexibility supports.

Other advantages of the present invention will become apparent in view of the following detailed description and accompanying drawings.

DETAILED DESCRIPTION OF PREFERRED EMBODIMENTS

Figure 1:
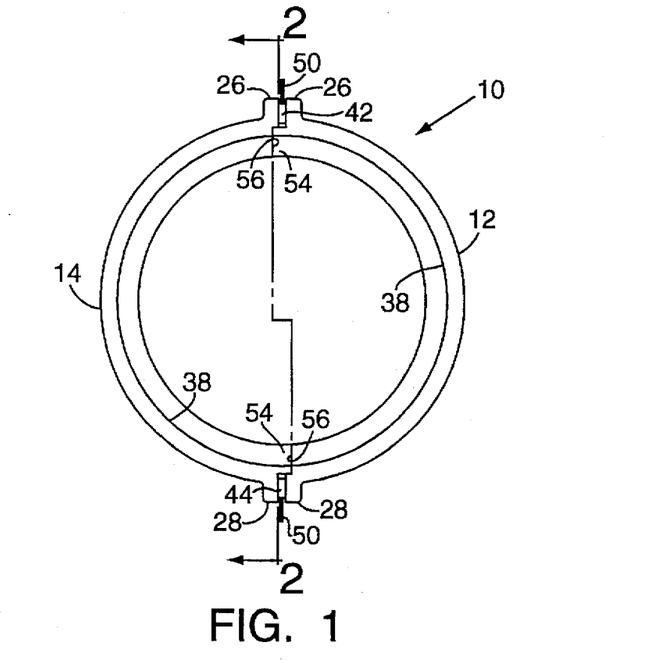
FIG. 1 is an elevational view of one end of a first embodiment of a closure fitting assembly of the present invention.

In FIG. 1, a closure fitting assembly embodying the present invention is indicated generally by the reference numeral 10. The fitting assembly 10 is a clam-shell type closure fitting, and includes a first fitting 12 adapted to be joined by electrical-resistance welding or electro-fusion to a second fitting 14. As indicated schematically in FIG. 2, the closure fitting assembly 10 is adapted to be connected between adjacent outer piping sections or other containment components 16 and 18 forming a gap in a double-containment system. A pair of inner piping sections or other carrier components 20 and 22 are located within the closure fitting assembly 10 and are connected together along a joint 24 formed prior to attachment of the closure fitting assembly 10 to close the gap and in turn seal the inner piping within the outer piping. The joint 24 may be made in any of numerous ways known to those skilled in the pertinent art, such as by welding, bonding or the use of a coupling.

Each of the first and second fittings 12 and respectively, defines a first axially-extending flange 26 located on one side of the fitting and a second axially-extending flange 28 located on the opposite side of the fitting. As shown best in FIGS. 2 and 4, each first axially-extending flange 26 defines a first axially-extending fusion surface 30 and each second axially-extending flange 28 defines a second axially-extending fusion surface 32. Each of the fittings 12 and 14 also defines a first socket flange 34 located on one end of the fitting and a second socket flange 36 located on the opposite end of the fitting for receiving the ends of the adjacent containment components 16 and 18 and fusing the closure fitting to the components, as is described further below. Each first socket flange 34 defines on its inner surface a first circumferentially-extending fusion surface 38, and each second socket flange 36 defines on its inner surface a second circumferentially-extending fusion surface 40.

Figure 2:
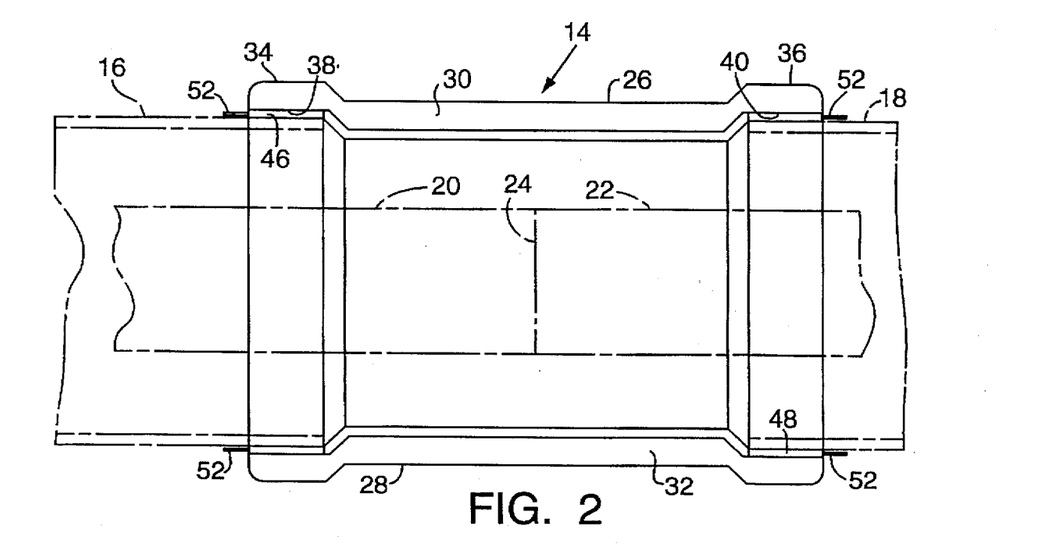
FIG. 2 is a cross-sectional view of the closure fitting assembly of FIG. 1 taken along the line 2—2 of FIG. 1 and illustrating schematically the connection of the closure fitting to adjacent containment components in a double-containment system.
Figure 3:
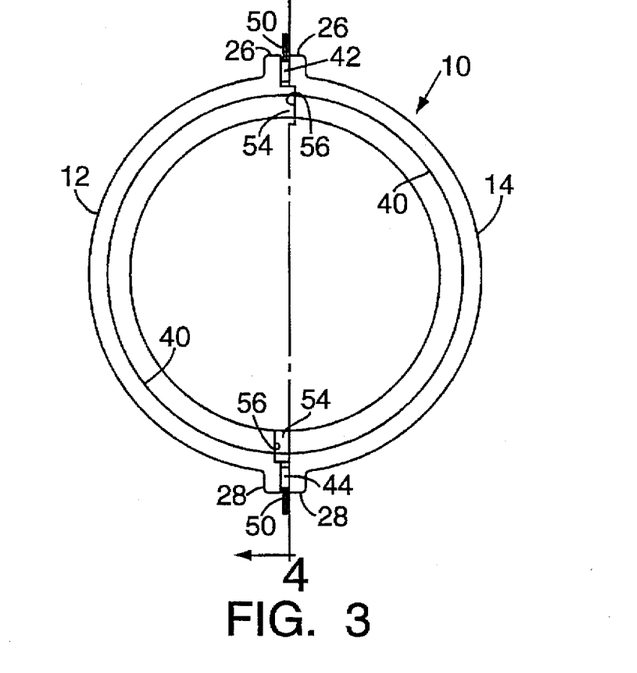
FIG. 3 is an elevational view of another end of the closure fitting assembly of FIG. 1.
Figure 4:
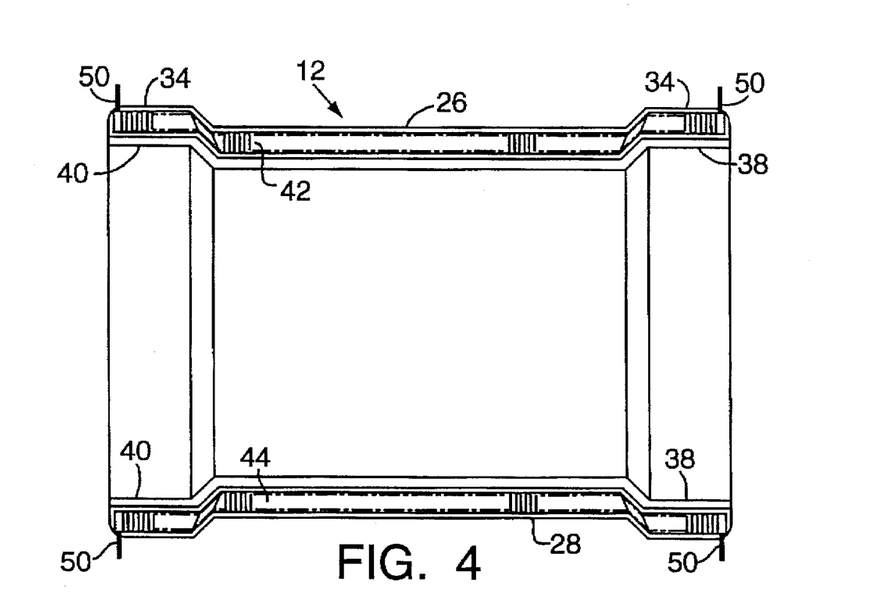
FIG. 4 is a cross-sectional view taken along line 4—4 of FIG. 3 and illustrating in further detail the axially-extending fusion wires for fusing the axially-extending seams of the fitting assembly.

As shown best in FIGS. 1 and 3, a first axially-extending fusion wire 42 is seated within the seam formed between the two first axially-extending fusion surfaces 30, and a second axially-extending fusion wire 44 is seated within the seam formed between the two second axially-extending fusion surfaces 32. Similarly, as shown in FIG. 2, a first circumferentially-extending fusion wire 46 is seated within the first socket flange 34 in engagement with the first circumferentially-extending fusion surface 38, and a second circumferentially-extending fusion wire 48 is seated within the second socket flange 36 in engagement with the second circumferentially-extending fusion surface 40. As shown in FIG. 4, a connector 50 is formed at each end of each axially-extending fusion wire 42 and 44 for connecting the respective wire to a suitable current source (not shown). Similarly, as shown in FIG. 2, a pair of connectors 52 are formed on diametrically opposite sides of each circumferentially-extending fusion wire 46 and 48 for connecting the respective wire to a suitable current source (not shown).

In the embodiment of the present invention illustrated, and as shown typically in FIG. 4, each fusion wire is preferably of a type sold by Orion Fittings, Inc. of Kansas City, Kans., and is formed in the shape of a flat coil defining a series of U-shaped portions extending across the width of the respective fusion surface. For the axially-extending fusion wires, each flat coil is shaped to conform to the shape of the corresponding fusion surfaces. Similarly, for each circumferentially-extending fusion wire, the wire is preferably formed in the shape of a cylinder dimensioned to slip fit into the respective fusion socket in engagement with the corresponding circumferentially-extending fusion surface. One advantage of the U-shaped coil configuration, is that the coil surfaces are seated in contact with a substantial portion of the surface areas of the adjacent fusion surfaces, thus causing the surfaces to thoroughly fuse together and form a high-integrity seam.

Each of the fittings 12 and 14 also defines a raised surface area, and the other defines a corresponding depressed surface area for receiving the raised surface area in order to facilitate assembly of the two fittings and alignment of the corresponding fusion surfaces relative to each other. As shown in FIGS. 1 and 3, the first fitting 12 defines an axially-extending lip or raised surface area 54 along one edge of the first fitting, and the second fitting 14 defines an axially-extending recess 56 along the corresponding edge of the second fitting for receiving the lip 54. Similarly, the second fitting 14 defines an axially-extending raised surface area or lip 54 on the opposite side of the fitting, and the first fitting 12 defines a corresponding axially-extending recess 56 for receiving the lip 54 of the second fitting. The flange or lip portions formed between the circumferentially-extending fusion surfaces and adjacent portions of the axially-extending fusion surfaces also function to electrically insulate the respective axially-extending and circumferentially-extending fusion wires relative to each other. This electrically-insulating medium (in thermoplastic applications) and/or the distance between adjacent coils may be particularly critical if the adjacent joints are fused at the same time.

Figure 5:
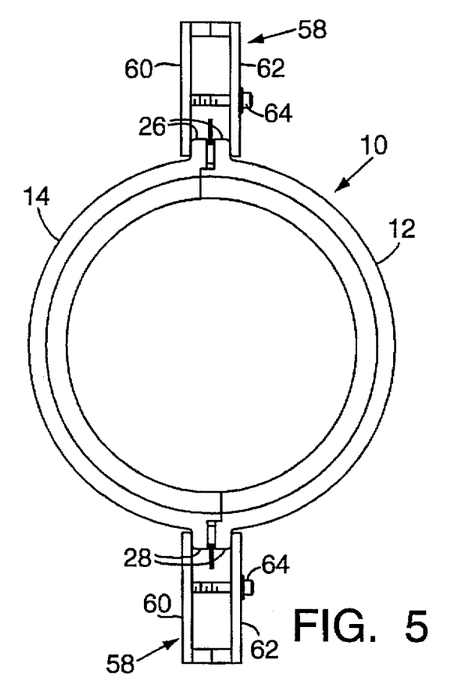
FIG. 5 is another elevational view of one end of the closure fitting assembly illustrating a pair of clamp assemblies attached to the axially-extending flanges of the fitting assembly to facilitate fusion of the axially-extending seams.
Figure 6:
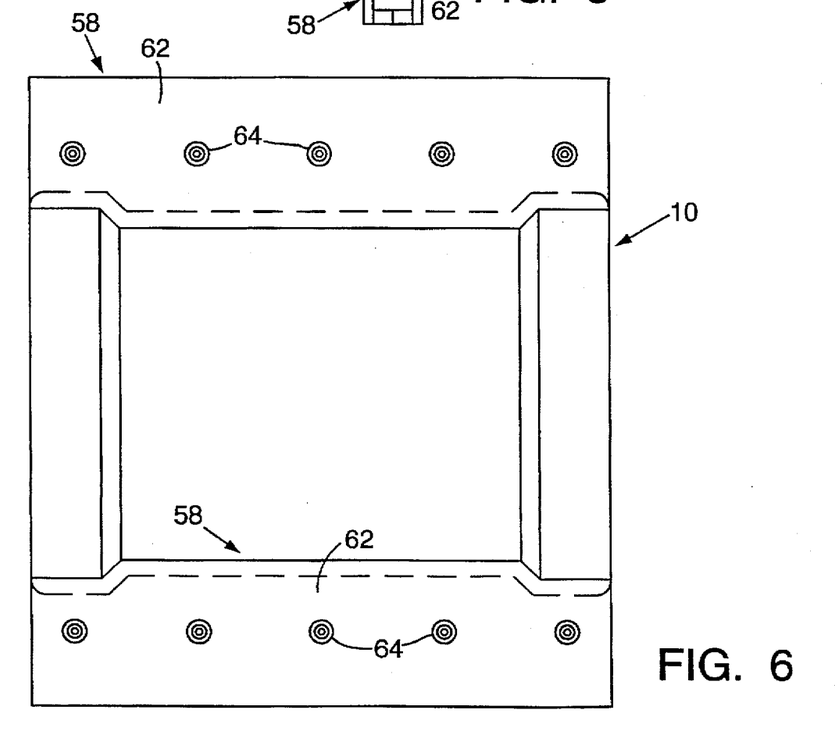
FIG. 6 is a side elevational view of the closure fitting and clamp assembly of FIG. 5.

As shown in FIGS. 5 and 6, with the first and second fittings assembled to each other and to the adjacent containment components, and the fusion wires inserted within the respective seams as shown, a clamp assembly 58 is attached to the first axially-extending flanges 26 and another clamp assembly 58 is attached to the second axially-extending flanges 28 to press the respective flange pairs toward each other. This in turn presses the axially-extending fusion surfaces into engagement with the respective axially-extending fusion wires to ensure complete and uniform engagement between the fusion wires and the corresponding fusion surfaces, and thereby facilitate the formation of a uniform and high-integrity fusion joint throughout each axially-extending seam. The clamp assemblies also cause the socket flanges 34 and 36 to uniformly press against and engage the circumferentially-extending fusion wires to facilitate fusion along the circumferential interface with the outer pipes or adjacent containment components.

As shown in FIG. 5, each clamp assembly 58 includes a first plate 60 seated in engagement with one side of the respective flange pair, and a second plate 62 seated in engagement with the opposite side of the respective flange pair. A plurality of bolts 64 are spaced relative to each other in the axial direction of the fitting assembly and are threadedly engaged between the first and second plates to clamp the plates together, and in turn press the flange pairs toward each other as described above. As will be recognized by those skilled in the pertinent art, any of numerous different clamping arrangements or other means may be employed to press or clamp the two fittings together as necessary to ensure the formation of a high-integrity fusion bond throughout each seam.

One advantage of the embodiment of the present invention illustrated is that the first and second fittings 12 and 14 are identical to each other; when assembled, one fitting is rotated 180° relative to the other, such that one is the mirror image of the other. Accordingly, this may significantly reduce the manufacturing or investment costs by requiring only one mold, and by reducing the number of fittings that must be maintained on hand.

Figure 7:
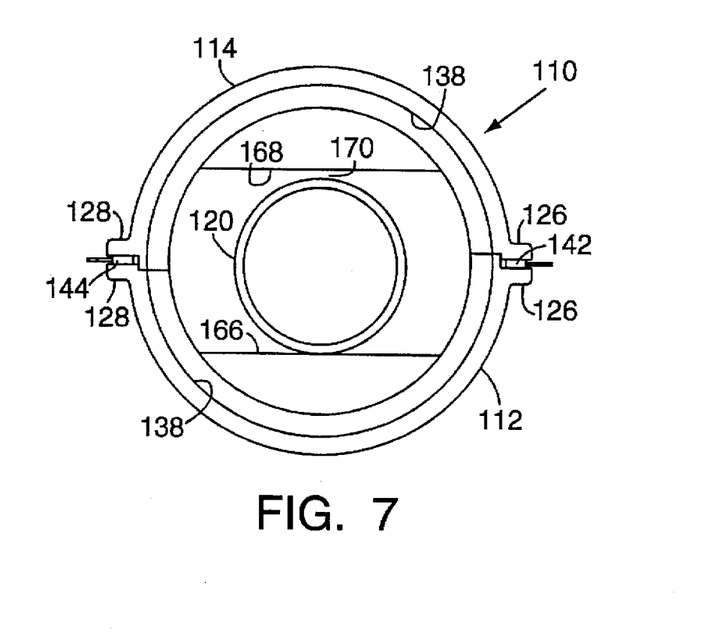
FIG. 7 is an elevational view of one end of a second embodiment of a closure fitting assembly of the present invention including a flexibility support permitting axial and lateral movement of the inner piping relative to the closure fitting and outer piping.
Figure 8:
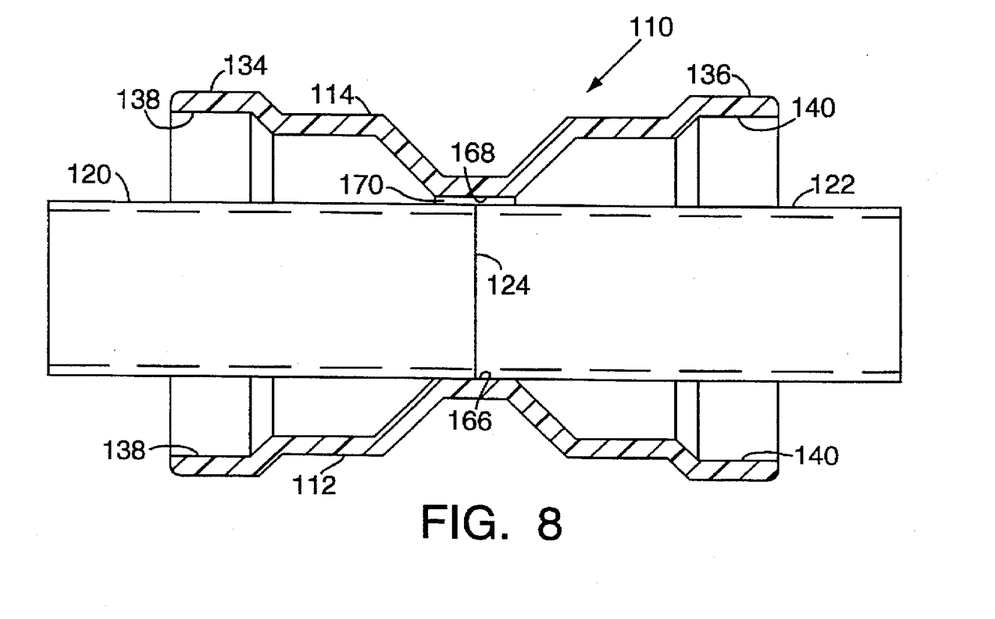
FIG. 8 is a cross-sectional view of the closure fitting assembly of FIG. 7.

Turning to FIGS. 7 and 8, another closure fitting assembly embodying the present invention is indicated generally by the reference numeral 110. The fitting assembly 110 is the same in many respects as the fitting assembly 10 described above with reference to FIGS. 1 through 6, and therefore like reference numerals preceded by the numeral 1 are used to indicate like elements. The primary difference between the fitting assembly 110 and the previous embodiment, is that the fitting assembly 110 comprises a flexibility support having means for supporting the inner piping or carrier components within the outer piping or containment components, and for permitting axial and lateral movement of the inner piping relative to the fitting assembly and other containment components.

As shown in FIGS. 7 and 8, the first fitting 112 defines a first flexibility support surface 166 spaced inwardly toward the second fitting 114 and extending in a lateral direction relative to the axis of the fitting assembly from one side of the fitting to the other. Since the second fitting 114 is identical to the first fitting 112, the second fitting likewise defines a second flexibility support surface 168 spaced inwardly toward the first fitting 112 and extending laterally from one side of the fitting to the other. In the embodiment of the present invention illustrated, the first fitting 112 is mounted below the inner piping and the axially-extending seams of the assembly are approximately located within a horizontal plane. Accordingly, the weight of the inner piping causes the piping to rest against the first support surface 166, and to in turn define a gap 170 between the inner piping and the second support surface 168 to permit relative movement between the inner piping and closure fitting assembly.

Accordingly, the inner piping 120 and 122 is permitted to slide both axially and laterally on the flexibility support surface 166, and thus move both axially and laterally relative to the outer piping and closure fitting assembly in response to thermal expansion and contraction. In addition, depending upon the width of the gap 170, the inner piping is permitted to move radially, if necessary, within the gap. As will be recognized by those skilled in the pertinent art, the width of the gap may be selected to constrain radial movement of the inner piping (by minimizing the gap width) or to permit radial movement of the inner piping (by maximizing the gap width).

Figure 9:
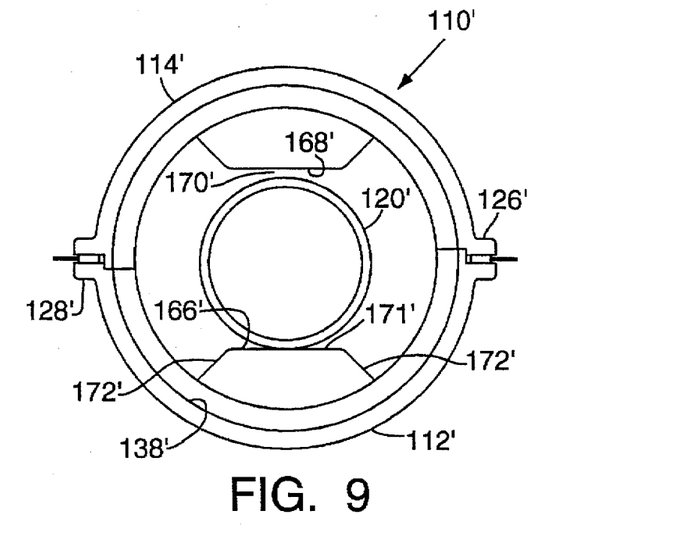
FIG. 9 is an elevational view of one end of a third embodiment of a closure fitting assembly of the present invention also including a flexibility support permitting axial and lateral movement of the inner piping relative to the closure fitting and outer piping.
Figure 10:
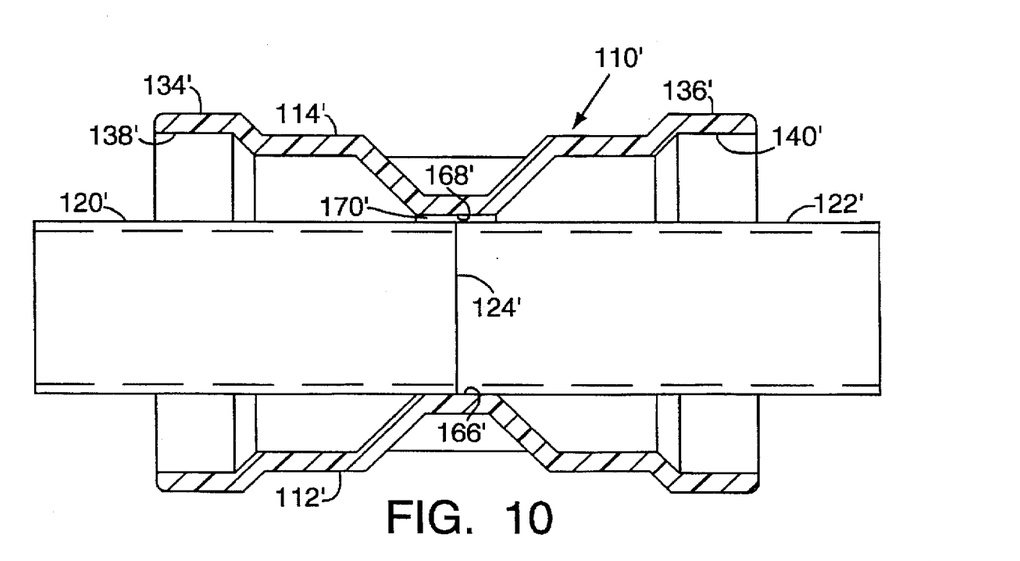
FIG. 10 is a cross-sectional view of the closure fitting assembly of FIG. 9.

In FIGS. 9 and 10, another embodiment of the fitting assembly 110 is indicated generally by the reference numeral 110'. The fitting assembly 110' is essentially the same as the fitting assembly 110, and therefore like reference numerals including a prime designation (') are used to indicate like elements. The only difference between the fitting assembly 110' and the fitting assembly 110, is that the first flexibility support surface 166' defines a substantially flat central portion 171' for supporting the inner piping or carrier components, and opposing end portions 172' which each taper inwardly and downwardly toward the inner diametrical surface of the closure fitting assembly. The purpose of the inwardly-tapering surface portions 172' is to facilitate fluid flow through the annulus between the inner piping or carrier components and the closure fitting assembly, and thereby minimize "puddling" of any fluid leaked within the annulus.

One advantage of the fitting configuration shown in FIGS. 7 through 10 is that the recessed surface area on the external side of each support surface 166 may be used to grip or otherwise support the fitting assembly with a conformably-shaped tool. In addition, in underground applications, this recessed area may be filled with soil and thereby inherently function to anchor the system. Yet another advantage of this configuration is that an additional support, such as a ring-shaped metal support (not shown), may be mounted in surrounding engagement with the external recessed surface to provide additional structural support. This may be particularly advantageous in applications where a thermoplastic outer pipe is designed to house a metallic carrier pipe, such as when the outer pipe and corresponding fitting assembly are made of polypropylene, in which case the fitting assembly may need additional support.

Figure 11:
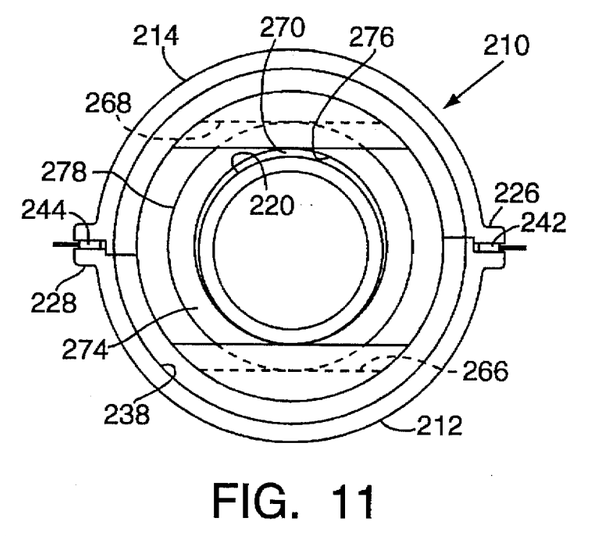
FIG. 11 is an elevational view of one end of a fourth embodiment of a closure fitting assembly of the present invention including a flexibility support permitting axial, lateral and radial movement of the inner piping relative to the closure fitting and outer piping.
Figure 12:
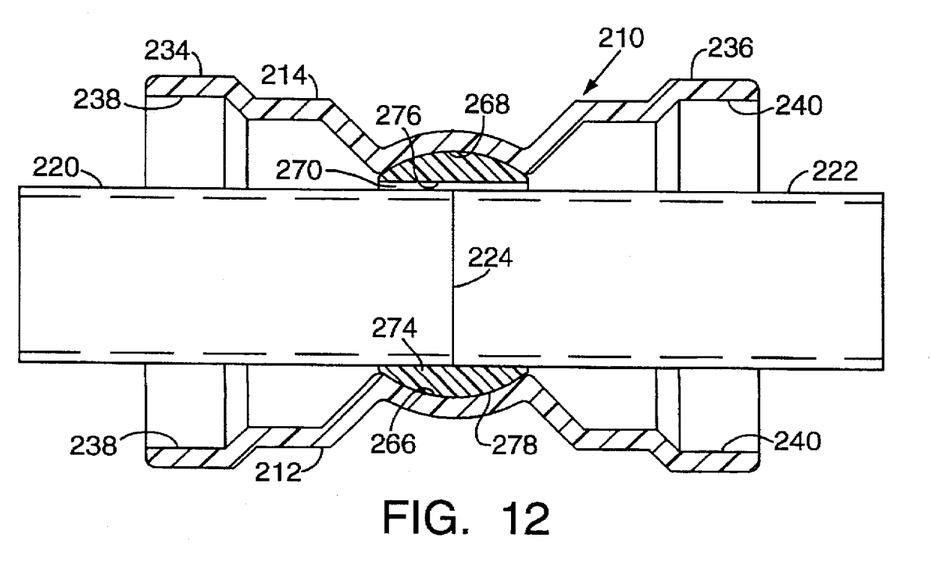
FIG. 12 is a cross-sectional view of the closure fitting assembly of FIG. 9.

Turning to FIGS. 11 and 12, another embodiment of a closure fitting assembly of the present invention is indicated generally by the reference numeral 210. The fitting assembly 210 is similar in many respects to the fitting assembly 110 described above with reference to FIGS. 7 through 10, and therefore like reference numerals preceded by the numeral 2 instead of the numeral 1 are used to indicate like elements. The primary difference between the fitting assembly 210 and the fitting assembly 110, is that the fitting assembly 210 includes means for permitting axial, lateral and radial movement of the inner piping or carrier components relative to the closure fitting and other containment components.

As shown best in FIG. 12, the support surfaces 266, 268 are each formed in a curvilinear shape defined by a radius of curvature (and convex in cross section), each are spaced inwardly toward the other, and both extend in the lateral direction relative to the axis of the respective fitting from one side of the respective fitting to the other. As shown in FIGS. 11 and 12, an approximately ball-shaped bearing 274 is seated between the opposing curvilinear support surfaces 266, 268 of the first and second fittings. The bearing 274 defines a central aperture 276 extending through the bearing for receiving and supporting the inner piping or containment components within the closure fitting assembly. As shown best in FIG. 12, the bearing 274 also defines an external bearing surface 278 having a curvilinear, partly spherical shape, and which is seated in conforming engagement with the curvilinear support surfaces 266, 268 of the first and second fittings.

Accordingly, the bearing 274 is permitted to move laterally and rotate relative to the support surfaces 266, 268, thus in turn permitting both lateral and radial movement of the inner piping or carrier components relative to the closure fitting and other containment components. As shown in FIGS. 11 and 12, the inner diameter of the central aperture 276 of the bearing is greater than the outer diameter of the inner piping 220 and 222, thus defining a gap 270 between the inner piping and bearing to permit axial movement of the inner piping or other carrier components relative to the closure fitting assembly and other containment components.

Figure 13:
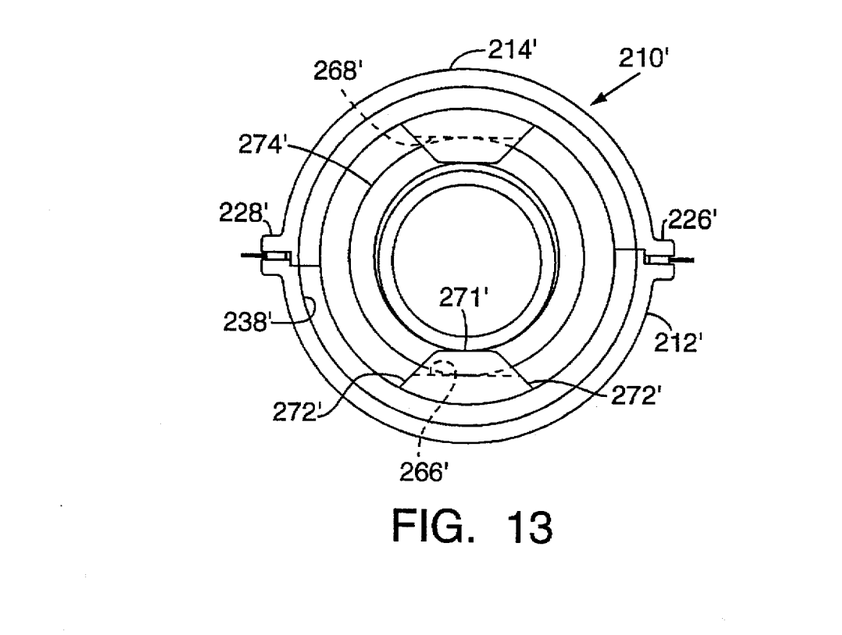
FIG. 13 is an elevational view of one end of a fifth embodiment of a closure fitting assembly of the present invention also including a flexibility support permitting axial, lateral and radial movement of the inner piping relative to the closure fitting and outer piping.
Figure 14:
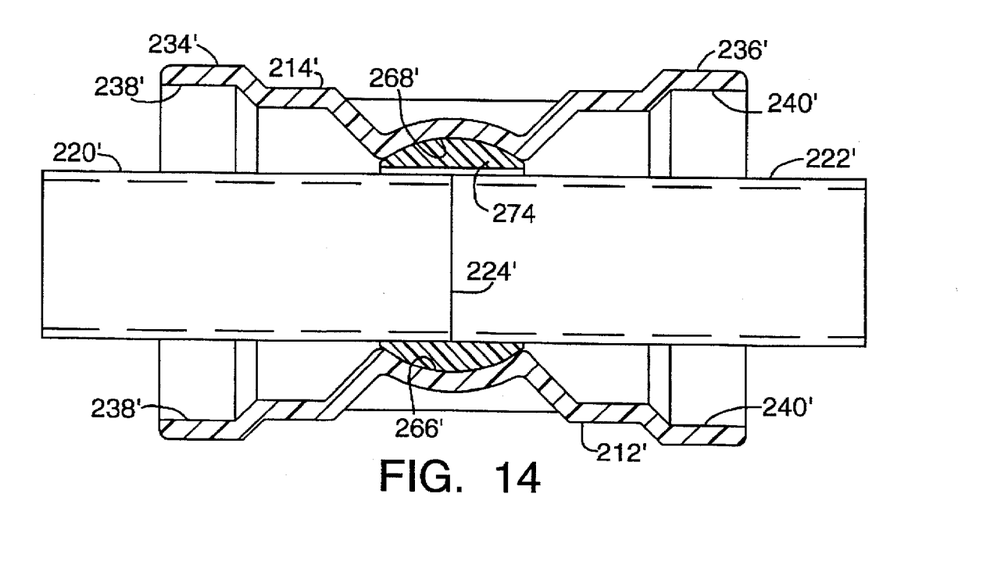
FIG. 14 is a cross-sectional view of the closure fitting assembly of FIG. 13.

In FIGS. 13 and 14, another embodiment of the fitting assembly 210 is indicated generally by the reference numeral 210'. The fitting assembly 210' is essentially the same as the fitting assembly 210, and therefore like reference numerals including a prime designation (') are used to indicate like elements. The only difference between the fitting assembly 210' and the fitting assembly 210, is that the first flexibility support surface 266' defines a substantially central portion 271' for supporting the bearing 274', and opposing end portions 272' which each taper inwardly and downwardly toward the inner diametrical surface of the closure fitting assembly. The purpose of the inwardly-tapering surface portions 272' is to facilitate fluid flow through the annulus between inner piping or carrier components and the closure fitting assembly and to prevent the collection of leaked fluid within the annulus.

As will be recognized by those skilled in the pertinent art, numerous changes and modifications may be made to the above-described and other embodiments of the present invention without departing from its scope as defined in the appended claims. For example, the closure fittings and/or flexibility support assemblies of the present invention may be made with any of numerous different known materials, including thermoplastics, metals and reinforced thermosetting resins or plastics, such as fiberglass. In addition, the flexibility supports of the present invention do not necessarily have to be made in the form of closure fittings, but rather (and particularly with the embodiments of FIGS. 11 through 14) may be made in the configuration of a flexibility support only to be mounted between an inner pipe or carrier component and an outer pipe or containment component to permit axial, lateral and/or radial movement of the carrier component relative to the containment component. As will also be recognized by those skilled in the pertinent art, the ball bearing may be shaped differently than shown (e.g., toroidal), and/or may be manufactured in more than one piece (e.g., two halves) to either reduce manufacturing costs and/or facilitate assembly.

As may also be recognized by those skilled in the pertinent art, the closure fittings and/or flexibility supports of the present invention may be embodied in numerous different types of fitting configurations, such as elbow fittings, branch couplings, tee couplings, lateral couplings, etc. The combination of a closure fitting and flexibility support as described above in the configuration of an elbow may be particularly advantageous in permitting additional flexibility supports to be mounted further away from the elbow than would otherwise be the case.

As may also be recognized by those skilled in the pertinent art, it may be desirable to mold the fusion wires or coils into a respective axially-extending fusion surface and/or circumferentially extending fusion surface when injection molding or otherwise forming the respective fitting in order to facilitate assembly of the fittings. Similarly, it may be necessary or desirable to coat the fusion wires or coils with the material with which the wire is being used to facilitate the resistance-welding or electro-fusion process. For example, if the fittings are made of polypropylene, it may be desirable to coat the wires with polypropylene in order to facilitate fusion of the polypropylene surfaces.

In addition, when the joint between the carrier components is formed by a coupling, as opposed to being bonded or welded, it may be necessary to offset the joint from the support surfaces in the embodiments of the present invention including a flexibility support in order to avoid interference between the coupling and flexibility support.

Accordingly, the detailed description of preferred embodiments disclosed herein is to be taken in an illustrative as opposed to a limiting sense.

I claim:

1. A closure fitting assembly for closing a gap between containment components in a double-containment system, comprising:

a first fitting defining an axis and including a first axially-extending fusion surface located on one side of the first fitting, a second axially-extending fusion surface located on an opposite side of the first fitting relative to the first axially-extending fusion surface, a first circumferentially-extending fusion surface located on one end of the first fitting, and a second circumferentially-extending surface located on an opposite end of the first fitting relative to the first circumferentially-extending fusion surface;

a second fitting for connection to the first fitting to close the gap between containment components, the second fitting defining an axis and including a first axially-extending fusion surface located on one side of the second fitting and facing the corresponding first axially-extending fusion surface of the first fitting, a second axially-extending fusion surface located on an opposite side of the second fitting relative to the respective first axially-extending fusion surface and facing the corresponding second axially-extending fusion surface of the first fitting, a first circumferentially-extending fusion surface located on one end of the second fitting, and a second circumferentially-extending fusion surface located on an opposite end of the second fitting relative to the respective first circumferentially-extending fusion surface;

at least one first axially-extending fusion wire interposed between the two first axially-extending fusion surfaces for the passage of electric current through the first axially-extending wire to fuse the two first axially-extending fusion surfaces together;

at least one second axially-extending fusion wire interposed between the two second axially-extending fusion surfaces for the passage of electric current through the second axially-extending wire to fuse the two second axially-extending fusion surfaces together;

at least one first circumferentially-extending fusion wire seated against the first circumferentially-extending fusion surfaces for the passage of electric current through the first circumferentially-extending wire to fuse the first circumferentially-extending fusion surfaces to an adjacent containment component; and at least one second circumferentially-extending fusion wire seated against the second circumferentially-extending fusion surfaces for the passage of electric current through the second circumferentially-extending wire to fuse the second circumferentially-extending fusion surfaces to an adjacent containment component.

2. A closure fitting assembly as defined in claim 1, wherein at least one of the first and second fittings defines at least one raised surface area and the other of the first and second fittings defines at least one corresponding depressed surface area for receiving the raised surface area for aligning the corresponding fusion surfaces of the first and second fittings relative to each other.

3. A closure fitting assembly as defining in claim 2, wherein each of the raised surface areas and the corresponding depressed surface areas extend in the axial direction of the respective fitting.

4. A closure fitting assembly as defined in claim 1, wherein at least one of the first and second fittings defines at least one flange formed between a respective circumferentially-extending fusion surface and an adjacent portion of at least one respective axially-extending fusion surface to electrically insulate the respective axially-extending and circumferentially-extending fusion wires relative to each other.

5. A closure fitting assembly as defined in claim 1, wherein:

the first fitting includes a first axially-extending flange defining the first axially-extending fusion surface of the first fitting and a second axially-extending flange defining the second axially-extending fusion surface of the first fitting; and the second fitting includes a first axially-extending flange defining the first axially-extending fusion surface of the second fitting, and a second axially-extending flange defining the second axially-extending fusion surface of the second fitting.

6. A closure fitting assembly as defined in claim 1, further comprising means for pressing the first axially-extending fusion surfaces toward each other and for pressing the second axially-extending fusion surfaces toward each other to facilitate fusion of the corresponding surfaces to each other.

7. A closure fitting assembly as defined in claim 1, wherein:
the first fitting includes a first socket flange defining the first circumferentially-extending fusion surface of the first fitting, and a second socket flange defining the second circumferentially-extending fusion surface of the first fitting; and
the second fitting includes a first socket flange defining the first circumferentially-extending fusion surface of the second fitting, and a second socket flange defining the second circumferentially-extending fusion surface of the second fitting.

8. A closure fitting assembly as defined in claim 1, wherein at least one of the first and second fittings includes means for supporting a carrier component within the closure fitting assembly.

9. A closure fitting assembly as defined in claim 8, further including means for permitting at least one of axial, lateral and radial movement of the carrier component relative to the closure fitting assembly.

10. A closure fitting assembly as defined in claim 9, wherein the means for supporting includes a first support surface located on the first fitting, the first support surface being spaced inwardly toward the second fitting and extending in a lateral direction relative to the axis of the first fitting.

11. A closure fitting assembly as defined in claim 9, wherein the means for supporting includes a second support surface located on the second fitting, the second support surface being spaced inwardly toward the first fitting and extending in a lateral direction relative to the axis of the second fitting.

12. A closure fitting assembly as defined in claim 1, further comprising a bearing member seated between the first and second fittings and defining an aperture extending through the bearing for receiving a carrier component and supporting the carrier component within the closure fitting.

13. A closure fitting assembly as defined in claim 12, further defining a space between the bearing and the carrier component received through the aperture to permit axial movement of the carrier component relative to the bearing and closure fitting.

14. A closure fitting assembly as defined in claim 12, wherein the bearing member defines a curvilinear bearing surface, and at least one of the first and second fittings defines a corresponding curvilinear support surface approximately conforming in shape to the bearing surface for receiving and supporting the bearing to permit rotatable movement of the bearing relative to the first and second fittings.

15. A closure fitting assembly as defined in claim 14, wherein the curvilinear support surface extends in a lateral direction relative to the axis of the fitting assembly to permit lateral movement of the bearing and carrier component relative to the first and second fittings.

* * * * *